(12) United States Patent
Reynolds et al.

(10) Patent No.: US 6,417,954 B1
(45) Date of Patent: Jul. 9, 2002

(54) NONLINEAR OPTICAL BORATES MATERIALS USEFUL FOR OPTICAL FREQUENCY CONVERSION

(75) Inventors: Thomas A. Reynolds; Theodore Alekel, both of Bend; Douglas A. Keszler, Corvallis, all of OR (US)

(73) Assignee: RejTech Corporation, Band, OR (US)

( * ) Notice: Subject to any disclaimer, the term of this patent is extended or adjusted under 35 U.S.C. 154(b) by 0 days.

(21) Appl. No.: 09/768,906

(22) Filed: Jan. 23, 2001

(51) Int. Cl.$^7$ .............................. G02F 1/39; C01B 35/12
(52) U.S. Cl. ........................... 359/330; 358/326; 117/3; 252/584; 423/277; 423/279; 51/126; 51/152
(58) Field of Search ................................ 359/326–332; 117/2, 3, 944–947; 252/582–584; 423/276, 277, 279, 297; 501/126, 152

(56) References Cited

U.S. PATENT DOCUMENTS 4,499,061 A * 2/1985 Glass .......................... 423/277
RE35,215 E * 4/1996 Waarts et al. ................ 372/108
5,742,626 A * 4/1998 Mead et al. .................... 372/22

OTHER PUBLICATIONS

Ebbers et al, "Nonlinear Optical Properties of K2La(NO3)5–2H2O and K2Ce(NO3)5–2H2O", IEEE Journal of Quantum Electronics, vol. 29, No. 2, Feb. 1993, pp. 497–507.*

Nakao et al, "Improvement of THG Performance by Suppression of Photo–Induced Damages in GdYCOB", Paper CThH7, 2000 Conference On Lasers and Electro–Optics (CLEO 2000), May 2000, San Francisco, pp. 428–439.*

Wu et al, "Optical Characterization Of A New Lanthanum And Calcium Borate La2CaB10O19", Paper CMC2, 2001 Conference On Lasers And Electro–Optics (CLEO 2001), May 2001, Baltimore, pp. 11–12.*

Becker, Borate materials in Nonlinear Optics, 1998, 979–992, Adv. Mater. 1998, 10, No. 13.

* cited by examiner

Primary Examiner—John D. Lee
(74) Attorney, Agent, or Firm—The Halvorson Law Firm

(57) ABSTRACT

Nonlinear optical materials, methods of crystal growth, and devices employing such materials satisfy the general formula $$(\Sigma_{i=1-3}M_{\alpha i}^1)(\Sigma_{j=1-3}M_{\beta j}^2)(\Sigma_{k=1-6}M_{\gamma k}^3)B_{14}O_{25} \quad \text{Formula 1}$$

wherein $M^1$, $M^2$, and $M^3$ are mono-, di, or tri-valent metal ions respectively; wherein $(\Sigma_{i=1-3}\alpha_i)=X$ and ranges from 0 to 2, $(\Sigma_{j=1-3}\beta_j)=Y$ and ranges from 0 to 4, and $(\Sigma_{k=1-6}\gamma_k)=Z$ and ranges from 0 to 2, and wherein X+Y+Z=4.0. Other nonlinear optical compounds according to this invention also generally satisfy Formula 2 through 7 below:

$$(\Sigma_{j=1-3}M_{\beta j}^2)B_{14}O_{25}, \text{ where } (\Sigma_{j=1-3}\beta_j)=4 \quad \text{Formula 2}$$

$$M_4^2B_{14}O_{25} \quad \text{Formula 3}$$

$$(\Sigma_{i=1-3}M_{\alpha i}^1)(\Sigma_{k=1-6}M_{\gamma k}^3)B_{14}O_{25} \quad \text{Formula 4}$$

where $(\Sigma_{i=1-3}\alpha_i)=2$, and $(\Sigma_{k=1-6}\gamma_k)=2$.

$$M_2^1M_2^3B_{14}O_{25} \quad \text{Formula 5}$$

$$(\Sigma_{i=1-3}M_{\alpha i}^1)(\Sigma_{j=1-3}M_{\beta j}^2)(\Sigma_{k=1-6}M_{\gamma k}^3)B_{14}O_{25} \quad \text{Formula 6}$$

where $(\Sigma_{i=1-3}\alpha_i)=1$, $(\Sigma_{j=1-3}\beta_j)=2$, and $(\Sigma_{k=1-6}\gamma_k)=1$. and $$M^1M_2^2M^3B_{14}O_{25} \quad \text{Formula 7.}$$

36 Claims, 1 Drawing Sheet

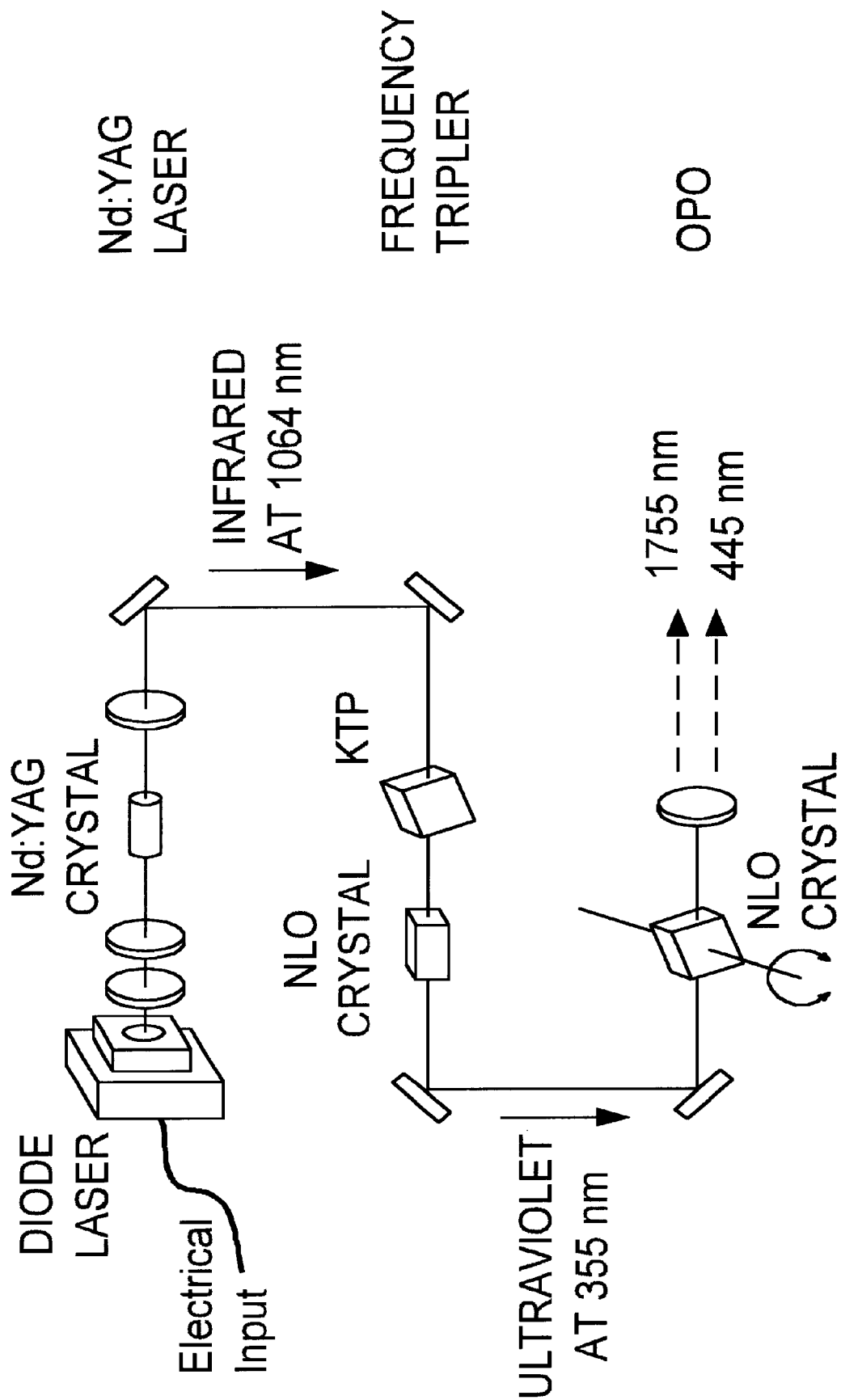

NONLINEAR OPTICAL BORATES MATERIALS USEFUL FOR OPTICAL FREQUENCY CONVERSION

FIELD OF THE INVENTION

The present invention is related to nonlinear optical materials, methods of crystal growth, and devices employing such materials. More specifically, the present invention is related to nonlinear optical materials that satisfy the general formula $(\Sigma_{i=1-3}M_{\alpha i}^{1})(\Sigma_{j=1-3}M_{\beta j}^{2})(\Sigma_{k=1-6}M_{\gamma k}^{3})B_{14}O_{25}$, wherein $M^1$, $M^2$, and $M^3$ are mono-, di-, or tri-valent metal ions respectively; wherein $(\Sigma_{i=1-3}\alpha_i)=X$ and ranges from 0 to 2, $(\Sigma_{j=1-3}\beta_j)=Y$ and ranges from 0 to 4, and $(\Sigma_{k=1-6}\gamma_k)=Z$ and ranges from 0 to 2; and wherein $X+Y+Z=4.0$.

BACKGROUND OF THE INVENTION

Nonlinear optical (NLO) materials are unusual in that they affect the properties of light. A well-known example is the polarization of light by certain materials, such as when materials rotate the polarization vectors of absorbed light. If the effect on the polarization vector by the absorbed light is linear, then light emitted by the material has the same frequency as the absorbed light. NLO materials affect the polarization vector of the absorbed light in a nonlinear manner. As a result, the frequency of the light emitted by a nonlinear optical material is affected.

More specifically, when a beam of coherent light of a given frequency, such as produced by a laser, propagates through a properly oriented NLO crystal having non-zero components of the second order polarizability tensor, the crystal will generate light at a different frequency, thus extending the useful frequency range of the laser. Generation of this light can be ascribed to processes such as sum-frequency generation (SFG), difference-frequency generation (DFG) and optical parametric amplification (OPA). Devices using NLO crystals include, but are not limited to up and down frequency converters, optical parametric oscillators, optical rectifiers, and optical switches.

Frequency generation in NLO materials is an important effect. For example, two monochromatic electromagnetic waves with frequencies $\omega_1$ and $\omega_2$ propagating through a properly oriented NLO crystal can result in generation of light at a variety of frequencies. Mechanisms defining the frequency of light using these two separate frequencies are sum-frequency generation and difference-frequency generation. SFG is a process where light of frequency $\omega_3$ is generated as the sum of the two incident frequencies, $\omega_3=\omega_1+\omega_2$. In other words, SFG is useful for converting long wavelength light to shorter wavelength light (e.g. near infrared to visible, or visible to ultraviolet). A special case of sum-frequency generation is second-harmonic generation (SHG) where $\omega_3=2\omega_1$, which is satisfied when the incident frequencies are equal, $\omega_1=\omega_2$. DFG is a process where light of frequency $\omega_4$ is generated as the difference of the incident frequencies $\omega_4=\omega_1-\omega_2$. DFG is useful for converting shorter wavelength light to longer wavelength light (e.g. visible to infrared). A special case of DFG is when $\omega_1=\omega_2$, hence $\omega_4=0$, which is known as optical rectification. Optical parametric oscillation is also a form of DFG and is used to produce light at tunable frequencies.

The conversion efficiency of an NLO crystal for a particular application is dependent on a number of factors that include, but are not limited to: the effective nonlinearity of the crystal (picometers/volt [pm/V]), birefringence ($\Delta n$, where n is a refractive index), phase-matching conditions (Type I, Type II, non-critical, quasi, or critical), angular acceptance angle (radian·cm), temperature acceptance (° K·cm), walk-off (radian), temperature dependent change in refractive index (dn/dt), optical transparency range (nm), and the optical damage threshold (watts/cm$^2$). Desirable NLO crystals should posses an optimum combination of the above properties as defined by the specific application.

Borate crystals form a large group of inorganic NLO materials used in laser-based manufacturing, medicine, hardware and instrumentation, communications, and research studies. Beta Barium Borate (BBO: $\beta$-BaB$_2$O$_4$), lithium triborate (LBO: LiB$_3$O$_5$), and cesium lithium borate (CLBO: CsLi(B$_3$O$_5$)$_2$) are examples of borate-based NLO crystals developed in recent years that are being used widely as NLO devices, especially in high power applications. Select properties suitable for generation of laser light from the mid-infrared to the ultraviolet for these crystals are listed in Table 1.

TABLE 1

Commercially Available NLO Materials and Properties

| PROPERTY | BBO | LBO | CLBO |
|---|---|---|---|
| $D_{eff}$ (pm/V) | 2 | 0.8 | 2.2–3.2 |
| Optical Transmission (nm) | 2600–190 | 2600–160 | — |
| Angular Acceptance (mrad · cm) | 1.0 | 7 | 1.7 |
| Temperature Acceptance (K · cm) | 55 | 7.5 | 2.5 |
| Walk-off Angle (mrad) | 56 | 6.5 | 16 |
| Damage Threshold ($10^9$ W/cm$^2$) | 15 | 25 | 25 |
| Crystal Growth Properties | flux or congruent melt | flux | congruent melt |

BBO has a favorable non-linearity (about 2 pm/V), transparency between 2600 nm and 190 nm, significant birefringence (necessary for phase matching), and a high damage threshold (15 GW/cm$^2$, 1064 nm, 0.1 ns pulse width). However, its high birefringence creates a relatively small angular acceptance that can limit conversion efficiencies. The crystal is relatively difficult to grow to large sizes and is somewhat hygroscopic.

LBO has good UV transparency (absorption edge$\cong$160 nm) and possesses a high damage threshold (25 GW/cm$^2$, 0.1 ns, 1064 nm). However, it has insufficient intrinsic birefringence for phase matching to generate deep UV radiation. Furthermore, LBO melts incongruently and must be prepared by flux-assisted crystal growth methods. This limits production efficiency that leads to small crystals and higher production costs.

CLBO appears to be a very promising material for high-power production of UV light due to a combination of high nonlinearity and high damage threshold. The crystal can also be manufactured to relatively large dimensions. Unfortunately, the crystal is exceedingly hygroscopic and invariably sorbs water from the air; hence, extreme care must be taken to manage environmental moisture to prevent hydration stresses and possible crystal destruction.

With so many intrinsic physical parameters to optimize, known optical frequency converters, at present, are applicable to specific applications. A major factor limiting the advancement of laser applications is the inability of conventional NLO devices to generate laser light at desired wavelengths, power levels, and beam qualities. Currently-available NLO materials are not able to meet specifications required by many applications due to a number of factors that include: small nonlinear coefficients, bulk absorption in energy regions of interest, poor optical clarity, low damage thresholds, instability under operation, environmental degradation, difficulty in device integration, and high fiscal costs of manufacture. In many cases, the fundamental limit of conventional NLO materials has been met, and as a result, they are not able to meet specifications required by many present and future applications. Related properties and shortcomings are discussed in Chemistry of Materials, 1:492–508 (1989), Keszler, Curr. Opinion in Solid State & Mater. Sci. 1, 204 (1996). Becker Adv. Mater. 10(13) p. 979–992 (1998), which are hereby incorporated by reference.

Because of the large number and diversity of present and projected applications, no single NLO material can be optimized for all uses. Thus far only a limited number of efficient NLO materials have been commercialized, thereby creating a bottleneck in the use of lasers in the advancement of many key technology areas. As a result, there is a continuing search for and development of new NLO materials.

SUMMARY OF THE INVENTION

It is an object of the present invention to produce and utilize nonlinear optical materials that satisfy:

$$(\Sigma_{i=1-3}M_{\alpha i}^1)(\Sigma_{j=1-3}M_{\beta j}^2)(\Sigma_{k=1-6}M_{\gamma k}^3)B_{14}O_{25} \quad \text{Formula 1}$$

wherein $M^1$, $M^2$, and $M^3$ are mono-, di-, or tri-valent metal ions respectively; wherein $(\Sigma_{i=1-3}\alpha_i)=X$ and ranges from 0 to 2, $(\Sigma_{j=1-3}\beta_j)=Y$ and ranges from 0 to 4, and $(\Sigma_{k=1-6}\gamma_k)=Z$ and ranges from 0–2, and wherein X+Y+Z=4.0. Mono-, di-, and tri-valent metal ions, $M^1$, $M^2$, and $M^3$, that are suitable for forming compounds satisfying Formula 1 can be independently selected from the group consisting of Groups IA, IIA, IIB, IIIA, VA, and lanthanide metals. The best results are achieved by independently selecting $M^1$ from the group consisting of potassium, rubidium, and cesium; $M^2$ from the group consisting of strontium, barium, and lead; $M^3$ from the group consisting of yttrium, lanthanum, cerium, gadolinium, lutetium, bismuth, praseodymium, neodymium, samarium, europium, terbium, dysprosium, holmium, erbium, thulium, and ytterbium. Preferably though, $M^3$ is selected from the group consisting of yttrium, lanthanum, cerium, gadolinium, lutetium, and bismuth. Examples of nonlinear optical materials satisfying Formula 1 include, but are not limited to, $Ba_4B_{14}O_{25}$, $Ba_3SrB_{14}O_{25}$, $K_2La_2B_{14}O_{25}$, and $RbBa_2LaB_{14}O_{25}$.

Another object of the present invention is to provide nonlinear optical compounds according to this invention also generally satisfy:

$$(\Sigma_{j=1-3}M_{\beta j}^2)B_{14}O_{25}, \text{ where } (\Sigma_{j=1-3}\beta_j)=4 \quad \text{Formula 2}$$

and more specifically $$M_4^2B_{14}O_{25} \quad \text{Formula 3}$$

wherein $M^2$ are divalent metal ions independently selected from the group consisting of Group IIA and IIB metals, and select transition series metals. Favorable results are achieved when compounds satisfying Formula 3 have M=Ba, Sr, or Pb. One example, without limitation, of a compound that satisfies Formulae 1, 2, and 3 is $Ba_4B_{14}O_{25}$.

It is yet another object of the present invention to provide nonlinear optical compounds according to this invention also satisfy:

$$(\Sigma_{i=1-3}M_{\alpha i}^1)(\Sigma_{k=1-6}M_{\gamma k}^3)B_{14}O_{25} \quad \text{Formula 4}$$

where $(\Sigma_{i=1-3}\alpha_i)=2$, and $(\Sigma_{k=1-6}\gamma_k)=2$.
and more specifically $$M_2^1M_2^3B_{14}O_{25} \quad \text{Formula 5}$$

wherein $M^1$ are monovalent metal ions and $M^3$ are trivalent metal ions, both independently selected from the group consisting of Group I and VA and Lanthanides. Favorable results are achieved when compounds satisfying Formula 5 have $M^1$=K, Rb, and Cs; $M^3$=Y, La, Ce, Gd, Lu, and Bi. One example, without limitation, of a compound that satisfies Formulae 1 and 3 is $K_2La_2B_{14}O_{25}$.

It is still yet another object of the present invention to provide nonlinear optical compounds according to this invention also satisfy Formulae 6 and 7 below:

$$(\Sigma_{i=1-3}M_{\alpha i}^1)(\Sigma_{j=1-3}M_{\beta j}^2)(\Sigma_{k=1-6}M_{\gamma k}^3)B_{14}O_{25} \quad \text{Formula 6}$$

where $(\Sigma_{i=1-3}\alpha_i)=1$, $(\Sigma_{j=1-3}\beta_j)=2$, and $(\Sigma_{k=1-6}\gamma_k)=1$.
and more specifically $$M^1M_2^2M^3B_{14}O_2 \quad \text{Formula 7}$$

wherein $M^1$ are monovalent metal ions and $M^2$ are divalent metal ions, and $M^3$ are trivalent metal ions, each independently selected from the group consisting of Group I, IIA, IIB, VA and Lanthanides. Favorable results are achieved when compounds satisfying Formula 7 have $M^1$=K, Rb, and Cs; M2=Ba, Sr, or Pb, and $M^3$=Y, La, Ce, Gd, Lu, and Bi. One example, without limitation, of a compound that satisfies Formulae 1 and 4 is $RbBa_2LaB_{14}O_{25}$.

It is a further object of the present invention to provide methods for making nonlinear optical materials that satisfy Formulae 1 through 7. One embodiment comprises forming a mixture comprising from about 15 to about 27 mole % of a source of M, and from about 65 to about 85 mole % of boron oxide. The mixture is heated to a temperature and for a period of time sufficient to form the NLO material. For instance, the step of heating may comprise heating the mixture to a first temperature of at least 825° K, and generally greater than about 850° K. The mixture is then cooled. After cooling the mixture is comminuted (ground to a fine powder, such as by grinding with a mortar and pestle), and then heated to a second temperature of at least 1000° K, generally greater than about 1000° K. If M is Ba, then the source of M generally is barium carbonate. If M is Sr, then the source of M generally is strontium carbonate.

It is a further object of the present invention to provide devices that use or require nonlinear optical materials for operation. An example of such a device, without limitation, is a harmonic generating crystal. A harmonic generating crystal is a crystal that is used to produce harmonic frequency outputs of inputted laser light frequencies. Another example, without limitation, of such a device is an optical parametric oscillator (OPO). An OPO uses NLO materials to produce tunable coherent light. Optical devices according to the present invention comprise a light source, such as a laser, optically coupled to nonlinear optical materials that satisfy Formula 1 through Formula 7. Naturally, the device could include additional components, such as, without limitation, photodetectors, photomultipliers, crystal mounts, lens and/or mirror systems, cooling systems a control and/or data acquisition computer, and the like.

The novel features that are considered characteristic of the invention are set forth with particularity in the appended claims. The invention itself, however, both as to its structure and its operation together with the additional objects and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

FIG. 1 is a schematic diagram illustrating an optical system that might use the nonlinear optical materials of the present invention.

DETAILED DESCRIPTION OF THE PREFERRED EMBODIMENTS

The present invention provides nonlinear optical materials that can be used for a number of optical applications include, but are not limited to, harmonic generation (HG), sum-frequency generation (SFG), difference-frequency generation (DFG) and optical parametric oscillation (OPO). The following paragraphs describe the nonlinear optical materials, as well as how to make and use the compounds.

I. Description of NLO Materials

The nonlinear optical materials of the present invention are formed from mono-, di-, and/or tri-valent metal ions, respectively, with the preferred embodiment being achieved by using divalent metal ions. The nonlinear optical materials have a complex borate framework, with the B:O ratio of the framework being about 14:25.

The present NLO materials generally satisfy the following:

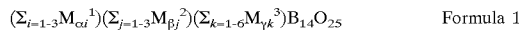  Formula 1 wherein $M^1$, $M^2$, and $M^3$ are mono-, di-, or tri-valent metal ions respectively; wherein $(\Sigma_{i=1-3}\alpha_i)=X$ and ranges from 0 to 2, $(\Sigma_{j=1-3}\beta_j)=Y$ and ranges from 0 to 4, and $(\Sigma_{k=1-6}\gamma_k)=Z$ and ranges from 0–2, and wherein $X+Y+Z=4.0$. $M^1$, $M^2$, and $M^3$ of Formula 1 are independently selected from Groups IA, IIA, IIB, IIIA, VA, and lanthanide metals, namely potassium, rubidium, cesium, strontium, barium, yttrium, lanthanum, cerium, praseodymium, neodymium, samarium, europium, gadolinium, terbium, dysprosium, holmium, erbium, thulium, ytterbium, lutetium, lead, and bismuth. The preferred embodiments are achieved by independently selecting $M^1$ from the group consisting of potassium, rubidium, and cesium; $M^2$ from the group consisting of strontium, barium, and lead; $M^3$ from the group consisting of yttrium, lanthanum, cerium, gadolinium, lutetium, bismuth, praseodymium, neodymium, samarium, europium, terbium, dysprosium, holmium, erbium, thulium, and ytterbium. Preferably though, $M^3$ is selected from the group consisting of yttrium, lanthanum, cerium, gadolinium, lutetium, and bismuth. Other species that charge balance the $B_{14}O_{25}$ species may also be used to form compounds satisfying Formula 1 as long as these compounds also exhibit NLO properties. Examples, without limitation, of compounds that satisfy Formula 1 include $Ba_4B_{14}O_{25}$, $Ba_3SrB_{14}O_{25}$, $K_2La_2B_{14}O_{25}$, $KBa_2LaB_{14}O_{25}$, and $Rb_2La_2B_{14}O_{25}$. Each of these compounds exhibits NLO characteristics.

Currently, the preferred compounds according to the present invention satisfy the following:

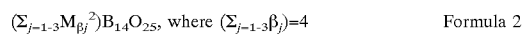  Formula 2 and more specifically

  Formula 3 wherein $M^2$ are divalent metal ions independently selected from the group consisting of Group IIA and IIB metals, and select transition series metals. Favorable results are achieved when compounds satisfying Formula 2 have M=Ba, Sr, or Pb. Other species that charge balance the $B_{14}O_{25}$ species may also be used to form compounds satisfying Formulae 2 and 3 as long as these compounds also exhibit NLO properties. By way of example and without limitation, one compound that satisfies general Formula 3 and which exhibits NLO properties is $Ba_4B_{14}O_{25}$.

Another working formulation of the present invention satisfy the following:

  Formula 4 where $(\Sigma_{i=1-3}\alpha_i)=2$, and $(\Sigma_{k=1-6}\gamma_k)=2$, and more specifically

  Formula 5 wherein $M^1$ are monovalent metal ions and $M^3$ are trivalent metal ions, both independently selected from the group consisting of Group I and VA and Lanthanides. Favorable results are achieved when compounds satisfying Formula 5 have $M^1$=K, Rb, and Cs; $M^3$=Y, La, Ce, Gd, Lu, and Bi. One example, without limitation, of a compound that satisfies Formulae 1 and 3 is $K_2La_2B_{14}O_{25}$.

Another working formulation of the present invention satisfy the following:

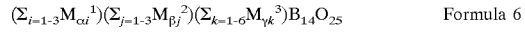  Formula 6 where $(\Sigma_{i=1-3}\alpha_i)(\Sigma_{j=1-3}\beta_j)=2$, and $(\Sigma_{k=1-6}\gamma_k)=1$, and more specifically

  Formula 7 wherein $M^1$ are monovalent metal ions and $M^2$ are divalent metal ions, and $M^3$ are trivalent metal ions, each independently selected from the group consisting of Group I, IIA, IIB, VA and Lanthanides. Favorable results are achieved when compounds satisfying Formula 7 have $M^1$=K, Rb, and Cs; $M^2$=Ba, Sr, or Pb, and $M^3$=Y, La, Ce, Gd, Lu, and Bi. One example, without limitation, of a compound that satisfies Formulae 1 and 4 is $RbBa_2LaB_{14}O_{25}$.

II. General Method for Making NLO Materials

A number of methods, now known or hereinafter developed, can be used to synthesize compounds that satisfy Formulae 1 through 7. In general, and without limitation, compounds satisfying Formulae 1 through 7 have been synthesized by heating appropriate molar amounts of starting materials to a temperature sufficient to form the nonlinear optical materials. First, a mixture was formed comprising appropriate molar amounts of a source of $M^1/M^2/M^3$ and boron oxide. The mixture was heated to a first temperature that generally was greater than about 850° K for times varying from minutes to several hours. The mixture was then cooled to room temperature at times varying from minutes to hours and ground using a mortar and pestle. The ground material was heated to a second temperature higher than the first temperature, such as to a temperature of greater than about 950° K. This second heating step continued for a period of time sufficient to form a single-phase product, times vary from minutes to hours depending on the material to be formed.

Crystals were grown from a stoichiometric melt once the desired compounds were obtained by the general method outlined above. To grow the crystals, the compounds were heated to a temperature above the melting point, and then slowly cooled at a rate of about 5–10° K/hour to a first temperature of about 900–1000° K. The material was then cooled to room temperature at a faster cooling rate, such as about 60° K/h. Transparent crystals of nonlinear optical materials satisfying Formulae 1 through 7 were obtained by this process.

III. Working Examples

The following examples describe particular embodiments of the present invention. These examples should be interpreted as being exemplary of the invention only, and not to limit the invention to the specific features discussed therein. Examples 1–5 describe particular processes used to synthesize compounds satisfying Formulae 1 through 7.

Example 1

$Ba_4B_{14}O_{25}$

This example describes the synthesis of $Ba_4B_{14}O_{25}$, Formula 3. Barium carbonate ($BaCO_3$) having a purity of greater than 99.9% and boron oxide ($B_2P_3$) have a purity of approximately 99.98%, were obtained from commercial vendors, such as Alpha Chemicals and Aesar. A 50 g sample was formed comprising a mixture of about 22 mole % barium carbonate and about 78 mole % boron oxide. The sample was placed in a ceramic crucible and heated at 893° K for about one hour. The sample was then cooled to room temperature at a rate of 50° K/h and comminuted or ground to a fine powder by grinding with a mortar and pestle. The ground sample was heated a second time at 970° K for eight hours to form a single-phase product.

Single crystals of this sample were then grown, by methods well known to one of ordinary skill in the arts, such as from a melt. The sample was placed in a 2 inch platinum crucible and heated to a temperature that was 100° K above the melting point of the sample for about 14 hours and cooled to a temperature of 893° K at a cooling rate of about 6° K/hr. The sample was then cooled to room temperature at a cooling rate of about 50° K/hr. Colorless, transparent crystals of $Ba_4B_{14}O_{25}$ were obtained.

Example 2

$Ba_4B_{14}O_{25}$

This example describes how crystals of $Ba_4B_{14}O_{25}$ can be grown using top-seeded solution crystal growth techniques. A 100 g sample of $Ba_4B_{14}O_2$ was prepared by mixing appropriate quantities of $BaCO_3$, and $B_2O_3$ using methods described in the above examples 1–3. The sample was melted in a 2" cylindrical Pt crucible and heated to a temperature of 100° K above the melting point for about 14 hours, 3 grams of NaF (purity greater than 99.9%) was added to reduce the viscosity of the melt, the melt was maintained at 1050° K for 18 hours. The temperature was dropped to 1020° K and a Pt wire was dipped into the melt. The wire was rotated at a rate of 8 rpm. The temperature of the melt was lowered 3° K/hr for 5 hr when nucleation on the wire was observed. The crystal was removed from the melt and the temperature was raised 10° K and the crystal was re-immersed in the solution. The cooling rate was adjusted to 0.2° K/hr and the crystal was rotated at a rate of 8 rpm. After 4 days, a crystal was removed from the melt and cooled to room temperature at a rate of 10° K/hr. The resultant crystal was 12 mm in length and about 8 mm in diameter, optically clear, and relatively free of cracks and inclusions.

The NLO materials of the present invention also can be combined with other materials to form compositions that are useful for a variety of purposes. For instance, such materials likely will be used in various electronic and laser applications. As a result, materials commonly used in these fields, such as inert fillers, may be combined with the NLO materials described herein, as long as such materials do not adversely alter the desired NLO properties. For instance, the nonlinear optical materials may be mixed with inert materials to form composites that still exhibit nonlinear optical properties, e.g., $Ba_4B_{14}O_{25}$ crystal(s) may be suspended in an optical plastic resin to form a composite nonlinear optical device, as an example.

Example 3

$Ba_3SrB_{14}O_{25}$

This example describes the synthesis of $Ba_3SrB_{14}O_{25}$, Formula 2. Barium carbonate ($BaCO_3$) having a purity of greater than 99.9%, strontium carbonate ($SrCO_3$) having a purity greater than 99.9%, and boron oxide ($B_2O_3$) having a purity of approximately 99.98% were obtained from commercial vendors. A 50 g sample was formed comprising about 16.5 mole % barium carbonate, about 5.5 mole % strontium carbonate, and about 78 mole % boron oxide. The sample was placed in a crucible and heated at 893° K for about one hour. The sample was then cooled to room temperature at 60° K/hr and comminuted using a mortar and pestle. The ground sample was heated a second time at 1073° K for about twelve hours to form a single-phase product.

Single crystals of this product were then grown from a melt, using similar procedures as described above in Example 1 to produce colorless, transparent crystals of $Ba_3SrB_{14}O_{25}$.

Example 4

$Ba_{3.8}Sr_{0.2}B_{14}O_{25}$

This example describes how crystals of $Ba_{3.8}Sr_{0.2}B_{14}O_{25}$, Formula 2, can be grown using conventional Czochralski crystal growth techniques. A 100 g sample of $Ba_{3.8}Sr_{0.2}B_{14}O_{25}$ was prepared by mixing appropriate quantities of $BaCO_3$, $SrCO_3$, and $B_2O_3$ using methods described in the above examples 1–3. The sample was melted in a 2" cylindrical Pt crucible and heated to a temperature of 100° K above the melting point of the sample for about 14 hours, 3 grams of NaF (purity greater than 99.9%) was added to reduce the viscosity of the melt and let stand for 16 hours. A single crystal of $Ba_{3.8}Sr_{0.2}B_{14}O_{25}$ (about 2 mm length, 0.5 mm diameter) was attached to a Pt wire for use as a seed crystal. The temperature was dropped to 1051° K and the seed crystal was dipped into the sample melt. The seed crystal was rotated about the Pt wire at 8 rpm. The temperature of the sample melt was lowered 0.5° K/hr until nucleation on the seed crystal was observed, at which point the seed crystal was pulled out of the melt using a vertically oriented lead screw driven by an electric motor at a rate of 1 mm/hr, and the cooling rate was adjusted to 0.2° K/hr. This process continued for 10 hours. The resultant crystal was extracted from the melt and was cooled to room temperature at a rate of 10° K/hr. The resultant crystal was 10 mm in length and about 4 mm in diameter, optically clear, and relatively free of cracks and inclusions.

Example 5

$K_2La_2B_{14}O_{25}$

This example describes the synthesis of $K_2La_2B_{14}O_{25}$, Formula 7. Potassium carbonate ($K_2CO_3$) having a purity of greater than 99.9%, reagent-grade lanthanum oxide ($La_2O_3$) having a purity greater than 99.9%, and boron oxide ($B_2O_3$) having a purity of approximately 99.98% pure were obtained from commercial vendors. A 50 g sample was formed comprising about 11 mole % potassium carbonate, about 11 mole % lanthanum oxide, and about 78 mole % boron oxide. The sample was placed in a crucible and heated at 923° K for about one hour. The sample was then cooled to room temperature at a rate of 60° K/hr and comminuted using a mortar and pestle. The ground sample was heated a second time at 1123° K for about twelve hours to form a single-phase product.

Single crystals of the sample were then grown from a stoichiometric melt as described above in Example 1 to produce colorless, transparent crystals of $K_2La_2B_{14}O_{25}$.

IV. NLO Properties

Nonlinear optical materials of the present invention can be used to generate harmonic light energy. A NewWave Nd:YAG pulsed laser (100 mJ, 7 ns pulse width, 20 Hz repetition rate) was used as a light source of 1064 nm ($2.818 \times 10^{14}$ Hz) light. The light was filtered and passed through samples of NLO single crystal made from Examples 1–5 that were mounted on an optical stage. Second harmonic light energy was frequency-converted by the NLO crystal and emerged as 532 nm ($5.635 \times 10^{14}$ Hz) light. This converted light was filtered for 532 nm transmission, passed through a neutral density (2.0) filter and thereby was directed onto a photomultiplier tube. The signal from the photomultiplier tube was converted to a voltage signal and fed into a Tektronix oscilloscope. After approximately one minute, the average signal was recorded. Crystalline $LiB_3O_5$ (LBO) served as the standard.

Data generated by practicing the steps stated above, shown in Table 2 below, shows that materials satisfying Formulae 1 through 7 function as nonlinear optical materials.

TABLE 2

Second Harmonic Generation Efficiency for Candidate Materials (1064–532 nm).

| Sample | Relative SHG Efficiency (normalized to LBO) |
|---|---|
| $Ba_4B_{14}O_{25}$ | 1.2 |
| $Ba_{3.8}Sr_{0.2}B_{14}O_{25}$ | 1.0 |
| $Ba_3SrB_{14}O_{25}$ | 0.6 |
| $K_2La_2B_{14}O_{25}$ | 0.5 |
| $LiB_3O_5$ | 1.0 |

As can be seen, each of the materials tested demonstrated conversion of the 1064 nm laser light into 532 nm light, demonstrating that the materials are indeed non-linear optical materials. The conversion efficiencies reported in this able were normalized to $LiB_3O_5$. It should be noted that these values are based on microcrystalline powders and provide a relative measurement of the SHG conversion efficiency. Regarding detailed interpretation of these results, it must be considered that the measurement or method does not correct for crystal orientation in the powdered sample or exact crystal size, and hence, may lead to less than optimum conversion efficiencies due to improper phase-matching conditions.

V. Hygroscopicity

The nonlinear optical materials of the present invention are relatively non-hygroscopic when compared to other NLO materials such as BBO and CLBO. Water absorption is a significant problem in the commercially available NLO materials CLBO and BBO and leads to major problems, ranging from degradation of performance to cracking of CLBO crystals upon exposure to humid environments. To determine the hygroscopic nature of the materials, candidate crystals prepared in example 1 were ground and passed through NIST sieves with a final mesh size of 200 mesh. Weighed amounts of the samples were placed in pre-dried platinum crucibles. The sample plus crucible were dried at 600° C. for 14 hours, and re-weighed. The samples were placed in a constant-humidity environment of 95% relative humidity (RH) at 299° K and removed after 16 hours and re-weighed. Table 3 shows the results of this study.

TABLE 3

Percent Water Gain of Powdered NLO Samples

| NLO Material | Initial NLO Sample Weight (g) | Final NLO Sample Weight (g) | Water Weight Gain (%) |
|---|---|---|---|
| $Ba_4B_{14}O_{25}$ | 10.3661 | 10.3883 | 0.21 |
| BBO | 11.2228 | 11.4428 | 1.78 |
| CLBO | 10.8896 | 11.6486 | 6.97 |

Data generated by practicing the steps stated above show that a material satisfying Formulae 1 through 7 are significantly less hygroscopic than other NLO materials.

VI. Nonlinear Optical Devices

Nonlinear optical materials can be used in a number of optical applications. For instance, the materials of the present invention can be used in a variety of devices that involve sum and difference frequency mixing, an example of sum frequency mixing is second harmonic generation (SHG) or third harmonic generation. Thus, the present invention also concerns devices that use nonlinear optical materials. These devices take advantage of the fact that the wavelength of the light produced by the nonlinear optical material is some value times the light entering the material. Such devices would include a light source and a nonlinear optical material optically coupled to the light source. Lasers, such as a Nd:YAG laser, are examples of light sources likely to be used with such devices. Herein, "optically coupled" means that the light emitted by the light source produces a polarization in the nonlinear optical material. This might simply mean that the output from the light source is focused on the nonlinear optical material. Alternatively, the device may include additional structural features, such as fiber optic cables and focusing lenses, so that the light emitted by the light source is transmitted efficiently to and focused on the nonlinear optical material. Moreover, the device may include additional components that are needed to perform a particular function, such as a mount for mounting crystals of the nonlinear optical material, and a photodetector for detecting light emitted by the light source and/or the nonlinear optical material. A schematic drawing of an optical system for third harmonic generation that utilizes a crystal of a nonlinear optical material is shown in FIG. 1.

Other devices include optical parametric oscillators (OPO). Optical parametric generation is a nonlinear optical process that uses a nonlinear optical crystal to split photon energy emitted by a laser into two new ones, termed signal and idler photon energies. The signal photon has a higher frequency than the idler photon. The sum of the two frequencies equals that of the pump laser frequency. Phase-matching conditions within the nonlinear crystal determine the ratio of the frequencies. Changing the phase-matching conditions alters the splitting ratio, thereby simultaneously tuning the signal and idle outputs. This allows an OPO to produce widely tunable coherent light.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A composition comprising a nonlinear optical material according to the formula $(\Sigma_{i=1-3}M_{\alpha i}^1)(\Sigma_{j=1-3}M_{\beta j}^2)(\Sigma_{k=1-6}M_{\gamma k}^3)B_{14}O_{25}$, wherein $M^1$, $M^2$, and $M^3$ are mono-, di-, or tri-valent metal ions respectively; wherein $(\Sigma_{i=1-3}\alpha_i)=X$ and ranges from 0 to 2, $(\Sigma_{j=1-3}\beta_j)=Y$ and ranges from 0 to 4, and $(\Sigma_{k=1-6}\gamma_k)=Z$ and ranges from 0 to 2, and wherein $X+Y+Z=4.0$.

2. The composition according to claim 1 wherein $X=0$, $Z=0$ and the general formula is $(\Sigma_{j=1-3}M_{\beta j}^2)B_{14}O_{25}$, where $(\Sigma_{j=1-3}\beta_j)=4$.

3. The nonlinear optical material according to claim 2 wherein $M^2$ is selected metals from Groups IIA and IIB.

4. The nonlinear optical material according to claim 2 wherein $M^2$ is selected from the group consisting of strontium, barium, and lead.

5. The nonlinear optical material according to claim 2 wherein the material is selected from the group consisting of $Ba_3SrB_{14}O_{25}$, $Ba_2Sr_2B_{14}O_{25}$, $BaSr_3B_{14}O_{25}$, $SrPb_3B_{14}O_{25}$, $Sr_2Pb_2B_{14}O_{25}$, $Sr_3PbB_{14}O_{25}$, $BaPb_3B_{14}O_{25}$, $Ba_2Pb_2B_{14}O_{25}$, and $Ba_3PbB_{14}O_{25}$.

6. The composition according to claim 2 wherein $M^2$ is a single species and the general formula is $M_4^2B_{14}O_{25}$.

7. The nonlinear optical material according to claim 6 wherein $M^2$ is selected metals from Groups IIA and IIB.

8. The nonlinear optical material according to claim 6 wherein $M^2$ is selected from the group consisting of strontium, barium, and lead.

9. The composition according to claim 1 wherein $Y=0$ and the general formula is $(\Sigma_{i=1-3}M_{\alpha i}^1)(\Sigma_{k=1-6}M_{\gamma k}^3)B_{14}O_{25}$, where $(\Sigma_{i=1-3}\alpha_i)=2$, and $(\Sigma_{k=1-6}\gamma_k)=2$.

10. The nonlinear optical material according to claim 9 wherein M1 and M2 are independently selected metals from the group consisting of Groups IA, IIIA, VA, and lanthanoids.

11. The nonlinear optical material according to claim 9 wherein M1 and M2 are independently selected from the group consisting of potassium, rubidium, cesium, yttrium, lanthanum, cerium, praseodymium, neodymium, samarium, europium, gadolinium, terbium, dysprosium, holmium, erbium, thulium, ytterbium, lutetium, and bismuth.

12. The nonlinear optical material according to claim 9 wherein the material is selected from the group consisting of $K_2Y_2B_{14}O_{25}$, $K_2La_2B_{14}O_{25}$, $K_2Ce_2B_{14}O_{25}$, $K_2Gd_2B_{14}O_{25}$, $K_2Lu_2B_{14}O_{25}$, $K_2Bi_2B_{14}O_{25}$, $Rb_2Y_2B_{14}O_{25}$, $Rb_2La_2B_{14}O_{25}$, $Rb_2Ce_2B_{14}O_{25}$, $Rb_2Gd_2B_{14}O_{25}$, $Rb_2Lu_2B_{14}O_{25}$, $Rb_2Bi_2B_{14}O_{25}$, $Cs_2Y_2B_{14}O_{25}$, $Cs_2La_2B_{14}O_{25}$, $Cs_2Ce_2B_{14}O_{25}$, $Cs_2Gd_2B_{14}O_{25}$, $Cs_2Lu_2B_{14}O_{25}$, and $Cs_2Bi_2B_{14}O_{25}$.

13. The composition according to claim 8 wherein $M^1$ is a single species and $M^3$ is a single species and the general formula is $M_2^1M_2^3B_{14}O_{25}$.

14. The nonlinear optical material according to claim 13 wherein M1 and M2 are independently selected metals from the group consisting of Groups IA, IIIA, VA, and lanthanoids.

15. The nonlinear optical material according to claim 13 wherein M1 and M2 are independently selected from the group consisting of potassium, rubidium, cesium, yttrium, lanthanum, cerium, praseodymium, neodymium, samarium, europium, gadolinium, terbium, dysprosium, holmium, erbium, thulium, ytterbium, lutetium, and bismuth.

16. The nonlinear optical material according to claim 13 wherein the material is selected from the group consisting of $K_2Y_2B_{14}O_{25}$, $K_2La_2B_{14}O_{25}$, $K_2Ce_2B_{14}O_{25}$, $K_2Gd_2B_{14}O_{25}$, $K_2Lu_2B_{14}O_{25}$, $K_2Bi_2B_{14}O_{25}$, $Rb_2Y_2B_{14}O_{25}$, $Rb_2La_2B_{14}O_{25}$, $Rb_2Ce_2B_{14}O_{25}$, $Rb_2Gd_2B_{14}O_{25}$, $Rb_2Lu_2B_{14}O_{25}$, $Rb_2Bi_2B_{14}O_{25}$, $Cs_2Y_2B_{14}O_{25}$, $Cs_2La_2B_{14}O_{25}$, $Cs_2Ce_2B_{14}O_{25}$, $Cs_2Gd_2B_{14}O_{25}$, $Cs_2Lu_2B_{14}O_{25}$, and $Cs_2Bi_2B_{14}O_{25}$.

17. The composition according to claim 1 wherein in the general formula $(\Sigma_{i=1-3}M_{\alpha i}^1)(\Sigma_{j=1-3}M_{\beta j}^2)(\Sigma_{k=1-6}M_{\gamma k}^3)B_{14}O_{25}(\Sigma_{i=1-3}\alpha_i)=1$, $(\Sigma_{j=1-3}\beta_j)=2$, and $(\Sigma_{k=1-6}\gamma_k)=1$.

18. The nonlinear optical material according to claim 17 wherein M1, M2, and M3 are independently selected metals from the group consisting of Groups IA, IIA, IIB, IIIA, VA, and lanthanoids.

19. The nonlinear optical material according to claim 17 wherein M1, M2, and M3 are independently selected from the group consisting of potassium, rubidium, cesium, strontium, barium, yttrium, lanthanum, cerium, praseodymium, neodymium, samarium, europium, gadolinium, terbium, dysprosium, holmium, erbium, thulium, ytterbium, lutetium, lead, and bismuth.

20. The nonlinear optical material according to claim 17 wherein the material is selected from the group consisting of $KSr_2YB_{14}O_{25}$, $KSr_2LaB_{14}O_{25}$, $KSr_2CeB_{14}O_{25}$, $KSr_2GdB_{14}O_{25}$, $KSr_2LuB_{14}O_{25}$, $KSr_2BiB_{14}O_{25}$, $KBa_2YB_{14}O_{25}$, $KBa_2LaB_{14}O_{25}$, $KBa_2CeB_{14}O_{25}$, $KBa_2GdB_{14}O_{25}$, $KBa_2LuB_{14}O_{25}$, $KSr_2BiB_{14}O_{25}$, $RbSr_2YB_{14}O_{25}$, $RbSr_2LaB_{14}O_{25}$, $RbSr_2CeB_{14}O_{25}$, $RbSr_2GdB_{14}O_{25}$, $RbSr_2LuB_{14}O_{25}$, $RbSr_2BiB_{14}O_{25}$, $RbBa_2YB_{14}O_{25}$, $RbBa_2LaB_{14}O_{25}$, $RbBa_2CeB_{14}O_{25}$, $RbBa_2GdB_{14}O_{25}$, $RbBa_2LuB_{14}O_{25}$, $RbBa_2BiB_{14}O_{25}$, $CsSr_2YB_{14}O_{25}$, $CsSr_2LaB_{14}O_{25}$, $CsSr_2CeB_{14}O_{25}$, $CsSr_2GdB_{14}O_{25}$, $CsSr_2LuB_{14}O_{25}$, $CsSr_2BiB_{14}O_{25}$, $CsBa_2YB_{14}O_{25}$, $CsBa_2LaB_{14}O_{25}$, $CsBa_2CeB_{14}O_{25}$, $CsBa_2GdB_{14}O_{25}$, $CsBa_2LuB_{14}O_{25}$, and $CsBa_2BiB_{14}O_{25}$.

21. The composition according to claim 17 wherein M1 is a single species, M2 is a single species, M3 is a single species and the general formula is $M^1M_2^2M^3B_{14}O_{25}$.

22. The nonlinear optical material according to claim 21 wherein M1, M2, and M3 are independently selected metals from the group consisting of Groups IA, IIA, IIB, IIIA, VA, and lanthanoids.

23. The nonlinear optical material according to claim 21 wherein M1, M2, and M3 are independently selected from the group consisting of potassium, rubidium, cesium, strontium, barium, yttrium, lanthanum, cerium, praseodymium, neodymium, samarium, europium, gadolinium, terbium, dysprosium, holmium, erbium, thulium, ytterbium, lutetium, lead, and bismuth.

24. The nonlinear optical material according to claim 21 wherein the material is selected from the group consisting of $KSr_2YB_{14}O_{25}$, $KSr_2LaB_{14}O_{25}$, $KSr_2CeB_{14}O_{25}$, $KSr_2GdB_{14}O_{25}$, $KSr_2LuB_{14}O_{25}$, $KSr_2BiB_{14}O_{25}$, $KBa_2YB_{14}O_{25}$, $KBa_2LaB_{14}O_{25}$, $KBa_2CeB_{14}O_{25}$, $KBa_2GdB_{14}O_{25}$, $KBa_2LuB_{14}O_{25}$, $KSr_2BiB_{14}O_{25}$, $RbSr_2YB_{14}O_{25}$, $RbSr_2LaB_{14}O_{25}$, $RbSr_2CeB_{14}O_{25}$, $RbSr_2GdB_{14}O_{25}$, $RbSr_2LuB_{14}O_{25}$, $RbSr_2BiB_{14}O_{25}$, $RbBa_2YB_{14}O_{25}$, $RbBa_2LaB_{14}O_{25}$, $RbBa_2CeB_{14}O_{25}$, $RbBa_2GdB_{14}O_{25}$, $RbBa_2LuB_{14}O_{25}$, $RbBa_2BiB_{14}O_{25}$, $CsSr_2YB_{14}O_{25}$, $CsSr_2LaB_{14}O_{25}$, $CsSr_2CeB_{14}O_{25}$, $CsSr_2GdB_{14}O_{25}$, $CsSr_2LuB_{14}O_{25}$, $CsSr_2BiB_{14}O_{25}$, $CsBa_2YB_{14}O_{25}$, $CsBa_2LaB_{14}O_{25}$, $CsBa_2CeB_{14}O_{25}$, $CsBa_2GdB_{14}O_{25}$, $CsBa_2LuB_{14}O_{25}$, and $CsBa_2BiB_{14}O_{25}$.

25. A method for making nonlinear optical materials according to the formula $(\Sigma_{i=1-3}M_{\alpha ki}^1)(\Sigma_{j=1-3}M_{\beta j}^2)(\Sigma_{k=1-6}M_{\gamma k}^3)B_{14}O_{25}$, wherein $M^1$, $M^2$, and $M^3$ are mono-, di-, or tri-valent metal ions respectively; wherein $(\Sigma_{i=1-3}\alpha_i)=X$ and ranges from 0 to 2, $(\Sigma_{j=1-3}\beta_j)=Y$ and ranges from 0 to 4, and $(\Sigma_{k=1-6}\gamma k)=Z$ and ranges from 0 to 2, and wherein X+Y+Z=4.0, the method comprising: forming a mixture comprising from about 5 to about 25 mole % of at least one source of $M^1$, from about 5 to about 25 mole % of at least one source of $M^2$, from about 5 to about 25 mole % of at least one source of $M^3$, and from about 25–85 mole % of boron oxide; and heating the mixture to a temperature sufficient to form the nonlinear optical material.

26. The method according to claim 25 wherein $M^1$, $M^2$, and $M^3$ are independently selected from the group consisting of Group IA, IIA, IIB, IIIA, VA, and lanthanoid metals.

27. The method according to claim 25 wherein $M^1$, $M^2$, and $M^3$ are independently selected from the group consisting of potassium, rubidium, cesium, strontium, barium, yttrium, lanthanum, cerium, praseodymium, neodymium, samarium, europium, gadolinium, terbium, dysprosium, holmium, erbium, thulium, ytterbium, lutetium, lead, and bismuth.

28. The method according to claim 25 wherein the step of heating further comprises: heating the mixture to a first temperature of at least 800° K; cooling the mixture; comminuting the mixture; and heating the mixture to a second temperature of at least 1000° K.

29. A method for making $Sr_4B_{14}O_{25}$, comprising: forming a mixture comprising about 22 mole % strontium carbonate, and about 78 mole % boron oxide; and heating the mixture to a temperature and for a period of time sufficient to form $Sr_4B_{14}O_{25}$.

30. The method according to claim 29 wherein the step of heating further comprises: heating the mixture to a first temperature of at least 800° K; cooling the mixture; comminuting the mixture; and heating the mixture to a second temperature of at least 1000° K.

31. A method for making $Ba_4B_{14}O_{25}$, comprising: forming a mixture comprising about 22 mole % barium carbonate, and about 78 mole % boron oxide; and heating the mixture to a temperature and for a period of time sufficient to form $Ba_4B_{14}O_{25}$.

32. The method according to claim 31 wherein the step of heating further comprises: heating the mixture to a first temperature of at least 800° K; cooling the mixture; comminuting the mixture; and heating the mixture to a second temperature of at least 1000° K.

33. An optical device, comprising: a laser; and a nonlinear optical material pumped by a laser or multiple lasers to produce an output by any of sum-frequency generation or difference-frequency generation, the optical material satisfying the general formula $(\Sigma_{i=1-3}M_{\alpha i}^1)(\Sigma_{j=1-3}M_{\beta j}^2)(\Sigma_{k=1-6}M_{\gamma k}^3)B_{14}O_{25}$, wherein $M^1$, $M^2$, and $M^3$ are mono-, di-, or tri-valent metal ions respectively; wherein $(\Sigma_{i=1-3}\alpha_i)=X$ and ranges from 0 to 2, $(\Sigma_{j=1-3}\beta_j)=Y$ and ranges from 0 to 4, and $(\Sigma_{k=1-6}\gamma_k)=Z$ and ranges from 0 to 2, and wherein X+Y+Z=4.0.

34. The device according to claim 33 wherein the nonlinear optical material is selected from the group consisting of $Sr_4B_{14}O_{25}$, $Ba_4B_{14}O_{25}$, $Pb_4B_{14}O_{25}$, $K_2Y_2B_{14}O_{25}$, $K_2La_2B_{14}O_{25}$, $K_2Ce_2B_{14}O_{25}$, $K_2Gd_2B_{14}O_{25}$, $K_2Lu_2B_{14}O_{25}$, $K_2Bi_2B_{14}O_{25}$, $Rb_2Y_2B_{14}O_{25}$, $Rb_2La_2B_{14}O_{25}$, $Rb_2Ce_2B_{14}O_{25}$, $Rb_2Gd_2B_{14}O_{25}$, $Rb_2Lu_2B_{14}O_{25}$, $Rb_2Bi_2B_{14}O_{25}$, $Cs_2Y_2B_{14}O_{25}$, $Cs_2La_2B_{14}O_{25}$, $Cs_2Ce_2B_{14}O_{25}$, $Cs_2Gd_2B_{14}O_{25}$, $Cs_2Lu_2B_{14}O_{25}$, $Cs_2Bi_2B_{14}O_{25}$, $KSr_2YB_{14}O_{25}$, $KSr_2LaB_{14}O_{25}$, $KSr_2CeB_{14}O_{25}$, $KSr_2GdB_{14}O_{25}$, $KSr_2LuB_{14}O_{25}$, $KSr_2BiB_{14}O_{25}$, $KBa2YB_{14}O_{25}$, $KBa_2LaB_{14}O_{25}$, $KBa_2CeB_{14}O_{25}$, $KBa_2GdB_{14}O_{25}$, $KBa_2LuB_4O_{25}$, $KSr_2BiB_{14}O_{25}$, $RbSr_2YB_{14}O_{25}$, $RbSr_2LaB_{14}O_{25}$, $RbSr_2CeB_{14}O_{25}$, $RbSr_2GdB_{14}O_{25}$, $RbSr_2LuB_{14}O_{25}$, $RbSr_2BiB_{14}O_{25}$, $RbBa_2YB_{14}O_{25}$, $RbBa_2LaB_{14}O_{25}$, $RbBa_2CeB_{14}O_{25}$, $RbBa_2GdB_{14}O_{25}$, $RbBa_2LuB_4O_{25}$, $RbBa_2BiB_{14}O_{25}$, $CsSr_2YB_{14}O_{25}$, $CsSr_2LaB_{14}O_{25}$, $CsSr_2CeB_{14}O_{25}$, $CsSr_2GdB_{14}O_{25}$, $CsSr_2LuB_{14}O_{25}$, $CsSr_2BiB_{14}O_{25}$, $CsBa_2YB_{14}O_{25}$, $CsBa_2LaB_{14}O_{25}$, $CsBa_2CeB_{14}O_{25}$, $CsBa_2GdB_{14}O_{25}$, $CsBa_2LuB_{14}O_{25}$, and $CsBa_2BiB_{14}O_{25}$.

35. An optical parametric oscillator and amplifier, comprising: a laser; and a nonlinear optical material satisfying the general formula $(\Sigma_{i=1-3}M_{\alpha i}^1)(\Sigma_{j=1-3}M_{\beta j}^2)(\Sigma_{k=1-6}M_{\gamma k}^3)B_{14}O_{25}$, wherein $M^1$, $M^2$, and $M^3$ are mono-, di-, or tri-valent metal ions respectively; wherein $(\Sigma_{i=1-3}\alpha_i)=X$ and ranges from 0 to 2, $(\Sigma_{j=1-3}\beta_j)=Y$ and ranges from 0 to 4, and $(\Sigma_{k=1-6}\gamma_k)=Z$ and ranges from 0 to 2, and wherein $X+Y+Z=4.0$, the nonlinear optical material being positioned in a cavity and pumped by the laser to produce sum and difference frequency mixing, the NLO material also being coupled to a tuner for selecting phase relationships between the pump, and signal and idler outputs, thereby producing an optical parametric oscillator and amplifier.

36. The device according to claim 35 wherein the nonlinear optical material is selected from the group consisting of $Sr_4B_{14}O_{25}$, $Ba_4B_{14}O_{25}$, $Pb_4B_{14}O_{25}$, $K_2Y_2B_{14}O_{25}$, $K_2La_2B_{14}O_{25}$, $K_2Ce_2B_{14}O_{25}$, $K_2Gd_2B_{14}O_{25}$, $K_2Lu_2B_{14}O_{25}$, $K_2Bi_2B_{14}O_{25}$, $Rb_2Y_2B_{14}O_{25}$, $Rb_2La_2B_{14}O_{25}$, $Rb_2Ce_2B_{14}O_{25}$, $Rb_2Gd_2B_{14}O_{25}$, $Rb_2Lu_2B_{14}O_{25}$, $Rb_2Bi_2B_{14}O_{25}$, $Cs_2Y_2B_{14}O_{25}$, $Cs_2La_2B_{14}O_{25}$, $Cs_2Ce_2B_{14}O_{25}$, $Cs_2Gd_2B_{14}O_{25}$, $Cs_2Lu_2B_{14}O_{25}$, $Cs_2Bi_2B_{14}O_{25}$, $KSr_2YB_{14}O_{25}$, $KSr_2LaB_{14}O_{25}$, $KSr_2CeB_{14}O_{25}$, $KSr_2GdB_{14}O_{25}$, $KSr_2LuB_{14}O_{25}$, $KSr_2BiB_{14}O_{25}$, $KBa_2YB_{14}O_{25}$, $KBa_2LaB_{14}O_{25}$, $KBa_2CeB_{14}O_{25}$, $KBa_2GdB_{14}O_{25}$, $KBa_2LuB_{14}O_{25}$, $KSr_2BiB_{14}O_{25}$, $RbSr_2YB_{14}O_{25}$, $RbSr_2LaB_{14}O_{25}$, $RbSr_2CeB_{14}O_{25}$, $RbSr_2GdB_{14}O_{25}$, $RbSr_2LuB_{14}O_{25}$, $RbSr_2BiB_{14}O_{25}$, $RbBa_2YB_{14}O_{25}$, $RbBa_2LaB_{14}O_{25}$, $RbBa_2CeB_{14}O_{25}$, $RbBa_2GdB_{14}O_{25}$, $RbBa_2LuB_{14}O_{25}$, $RbBa_2BiB_{14}O_{25}$, $CsSr_2YB_{14}O_{25}$, $CsSr_2LaB_{14}O_{25}$, $CsSr_2CeB_{14}O_{25}$, $CsSr_2GdB_{14}O_{25}$, and $CsSr_2LuB_{14}O_{25}$, $CsSr_2BiB_{14}O_{25}$, $CsBa_2YB_{14}O_{25}$, $CsBa_2LaB_{14}O_{25}$, $CsBa_2CeB_{14}O_{25}$, $CsBa_2GdB_{14}O_{25}$, $CsBa_2LuB_{14}O_{25}$, and $CsBa_2BiB_{14}O_{25}$.

* * * * *